Figure 1:
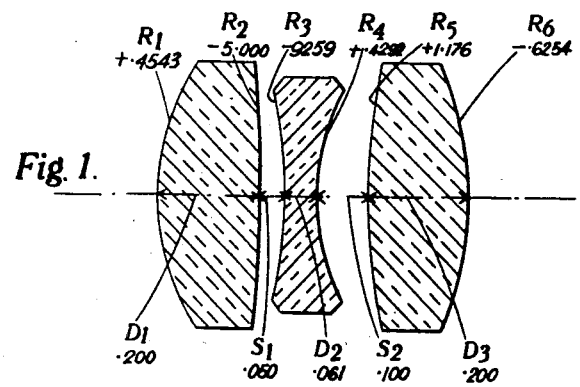
Figure 2:
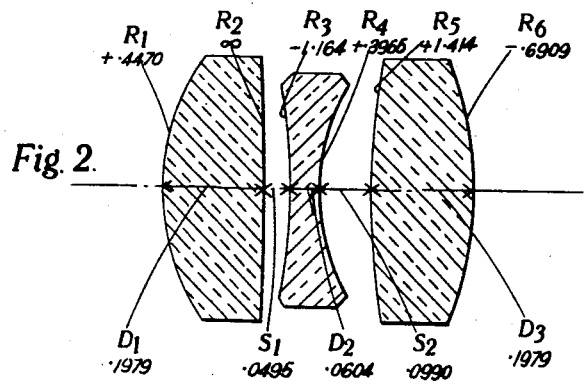
Figure 3:
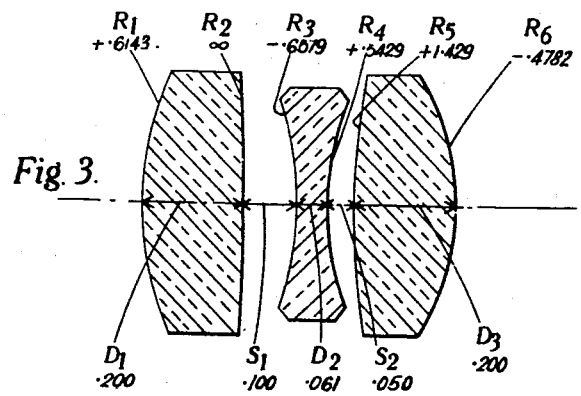

Jan. 20, 1942.  A. WARMISHAM  2,270,234

OPTICAL OBJECTIVE

Filed Dec. 14, 1939

Inventor
A. WARMISHAM
by Blair + Kilcoyne
Attorney

Patented Jan. 20, 1942

2,270,234

UNITED STATES PATENT OFFICE 2,270,234

OPTICAL OBJECTIVE

Arthur Warmisham, Leicester, England, assignor to Taylor, Taylor & Hobson Limited, Leicester, England, a company of Great Britain Application December 14, 1939, Serial No. 309,267
In Great Britain December 23, 1938

8 Claims. (Cl. 88—57)

This invention relates to an anastigmatically corrected objective for photographic or projection or like purposes, of the kind comprising three axially aligned components, each consisting of a simple element, the middle component being dispersive and the two outer components collective.

Attempts to design an objective of this kind with a high aperture, say F/2.5, have hitherto resulted in an objective having rather heavy residual zonal spherical aberration, thereby restricting their use to short focal lengths of 1½ inches or less.

The present invention has for its object to provide an objective of this kind in which the same high aperture can be obtained with considerably improved zonal spherical aberration correction, or alternatively in which a still higher aperture can be obtained with the same degree of residual zonal spherical aberration.

In the objective according to the invention each of the three components is made of a glass having a mean refractive index higher than 1.75 and preferably higher than 1.8. Various examples of glass having such high refractive index are given in British patent specification No. 462,304, such glass having as its main constituents oxides of elements such as tungsten, tantalum, lanthanum, thorium, yttrium, zirconium, hafnium and columbium.

The sum of the numerical values of the radii of curvature of the front surface of the front component and the rear surface of the rear component is preferably greater than the equivalent focal length of the objective and less than 1.33 times such focal length. The total axial length of the objective between such two surfaces preferably lies betwen 55% and 85% of the equivalent focal length of the objective.

It is to be understood that the term "front" as herein used refers to the side of the objective nearer to the longer conjugate and the term "rear" to that nearer the shorter conjugate.

Three convenient practical examples of objective according to the invention are illustrated respectively in the three figures of the accompanying drawing, and numerical data therefor are given in the following tables, in which the radii of curvature of the individual surfaces are designated by $R_1$ $R_2$ ... counting from the front, the positive sign indicating that the surface is convex towards the front and the negative sign that it is concave thereto, whilst the thicknesses of the individual elements along the axis are designated by $D_1$ $D_2$ $D_3$ and the axial air spaces between the components by $S_1$ $S_2$. The tables also give the mean refractive indices and the Abbé V numbers of the glasses used for the individual elements.

Example I

Equivalent focal length 1.000. Relative aperture F/2.5

| Radius | Thickness or separation | Refractive index $n_D$ | Abbé V number |
|---|---|---|---|
| $R_1=+.4543$ | | | |
| | $D_1=.200$ | 1.812 | 41.1 |
| $R_2=-5.000$ | | | |
| | $S_1=.050$ | | |
| $R_3=-.9259$ | | | |
| | $D_2=.061$ | 1.995 | 26.6 |
| $R_4=+.4292$ | | | |
| | $S_2=.100$ | | |
| $R_5=+1.176$ | | | |
| | $D_3=.200$ | 1.812 | 41.1 |
| $R_6=-.6254$ | | | |

Example II

Equivalent focal length 1.000. Relative aperture F/2.5

| Radius | Thickness or separation | Refractive index $n_D$ | Abbé V number |
|---|---|---|---|
| $R_1=+.4470$ | | | |
| | $D_1=.1979$ | 1.893 | 30.8 |
| $R_2=\infty$ | | | |
| | $S_1=.0495$ | | |
| $R_3=-1.164$ | | | |
| | $D_2=.0604$ | 2.022 | 19.1 |
| $R_4=+.3965$ | | | |
| | $S_2=.0990$ | | |
| $R_5=+1.414$ | | | |
| | $D_3=.1979$ | 1.893 | 30.8 |
| $R_6=-.6909$ | | | |

Example III

Equivalent focal length 1.000. Relative aperture F/2.25

| Radius | Thickness or separation | Refractive index $n_D$ | Abbé V number |
|---|---|---|---|
| $R_1=+.6143$ | | | |
| | $D_1=.200$ | 1.893 | 30.8 |
| $R_2=\infty$ | | | |
| | $S_1=.100$ | | |
| $R_3=-.6579$ | | | |
| | $D_2=.061$ | 2.022 | 19.1 |
| $R_4=+.5429$ | | | |
| | $S_2=.050$ | | |
| $R_5=+1.429$ | | | |
| | $D_3=.200$ | 1.893 | 30.8 |
| $R_6=-.4782$ | | | |

As will be seen, all three examples employ high index glass throughout, the glass used for the middle component in each case having higher refractive index and lower Abbé V number than that used for each of the two outer components. The sum of the numerical values of the two outermost radii is in Example I 1.0797, in Example II 1.1379 and in Example III 1.0925. The total axial length of the objective is in Examples I and III .611 and in Example I .5647.

The first two examples give good zonal spherical aberration correction for aperture F/2.5, whilst in the third example a higher aperture F/2.25 is obtained at the expense of leaving a residual zonal spherical aberration which restricts practical use of the objective to short focal lengths of 1½ inches or less.

What I claim as my invention and desire to secure by Letters Patent is:

1. An astigmatically corrected optical objective comprising three axially aligned simple lens elements separated by air gaps, of which the middle element is dispersive and the two outer elements are collective, each of the three elements being made of a glass having a mean refractive index higher than 1.75 whilst the sum of the numerical values of the radii of curvature of the front surface of the front component and the rear surface of the rear component is greater than the equivalent focal length of the objective and less than 1.33 times such focal length.

2. An astigmatically corrected optical objective comprising three axially aligned simple lens elements separated by air gaps, of which the middle element is dispersive and the two outer elements are collective, the dispersive element being made of a glass having a mean refractive index lying between 1.95 and 2.05, whilst the two collective elements are made of glass having higher Abbé V number than that used for the dispersive element and having mean refractive index lying between 1.75 and 1.90.

3. An optical objective as claimed in claim 2, in which the sum of the numerical values of the radii of curvature of the front surface of the front component and the rear surface of the rear component is greater than the equivalent focal length of the objective and less than 1.33 times such focal length.

4. An optical objective as claimed in claim 1, in which the total axial length of the objective lies between 55% and 85% of the equivalent focal length of the objective.

5. An optical objective as claimed in claim 2, in which the total axial length of the objective lies between 55% and 85% of the equivalent focal length of the objective.

6. An optical objective having numerical data as set forth in the following table:

*Example I*

Equivalent focal length 1,000. Relative aperture F/2.5

| Radius | Thickness or separation | Refractive index $n_D$ | Abbé V number |
|---|---|---|---|
| $R_1=+ .4543$ | $D_1=.200$ | 1.812 | 41.1 |
| $R_2=-5.000$ | $S_1=.050$ | | |
| $R_3=- .9259$ | $D_2=.061$ | 1.995 | 26.6 |
| $R_4=+ .4292$ | $S_2=.100$ | | |
| $R_5=+1.176$ | $D_3=.200$ | 1.812 | 41.1 |
| $R_6=- .6254$ | | | |

7. An optical objective having numerical data as set forth in the following table:

*Example II*

Equivalent focal length 1,000. Relative aperture F/2.5

| Radius | Thickness or separation | Refractive index $n_D$ | Abbé V number |
|---|---|---|---|
| $R_1=+ .4470$ | $D_1=.1979$ | 1.893 | 30.8 |
| $R_2=\infty$ | $S_1=.0495$ | | |
| $R_3=-1.164$ | $D_2=.0604$ | 2.022 | 19.1 |
| $R_4=+ .3965$ | $S_2=.0990$ | | |
| $R_5=+1.414$ | $D_3=.1979$ | 1.893 | 30.8 |
| $R_6=- .6909$ | | | |

8. An optical objective having numerical data as set forth in the following table:

*Example III*

Equivalent focal length 1,000. Relative aperture F/2.25

| Radius | Thickness or separation | Refractive index $n_D$ | Abbé V number |
|---|---|---|---|
| $R_1=+ .6143$ | $D_1=.200$ | 1.893 | 30.8 |
| $R_2=\infty$ | $S_1=.100$ | | |
| $R_3=- .6579$ | $D_2=.061$ | 2.022 | 19.1 |
| $R_4=+ .5429$ | $S_2=.050$ | | |
| $R_5=+1.429$ | $D_3=.200$ | 1.893 | 30.8 |
| $R_6=- .4782$ | | | |

ARTHUR WARMISHAM.